(12) United States Patent
Poustie (10) Patent No.: US 6,735,396 B2
(45) Date of Patent: May 11, 2004

(54) COMMUNICATIONS NETWORK (75) Inventor: Alistair J. Poustie, Ipswich (GB)

(73) Assignee: British Telecommunications, London (GB)

( * ) Notice: Subject to any disclaimer, the term of this patent is extended or adjusted under 35 U.S.C. 154(b) by 340 days.

(21) Appl. No.: 09/805,378

(22) Filed: Mar. 14, 2001

(65) Prior Publication Data
US 2001/0026387 A1 Oct. 4, 2001

(30) Foreign Application Priority Data
Mar. 27, 2000 (EP) .............................. 00302472

(51) Int. Cl.⁷ ............................................. H04B 10/00
(52) U.S. Cl. ......................... 398/155; 398/199; 398/25
(58) Field of Search ................. 398/154, 155, 398/199, 25

(56) References Cited

U.S. PATENT DOCUMENTS 5,900,956 A * 5/1999 Cotter .......................... 359/108
6,501,579 B2 * 12/2002 Li et al. ...................... 398/212

FOREIGN PATENT DOCUMENTS

EP 0 658 994 A * 6/1995 ............. H04L/7/00

OTHER PUBLICATIONS

Jepsen, K.S. et al. "All-Optical Network Interface for Bit Synchronisation and Regeneration." 23rd European Conference on Optical Communications (Conf. Publ. No.: 448), vol. 5, Sep. 22–25, 1997, pp. 89–92.*

Miura, T. et al. "Timing jitter measurement method for a kHz regenerative amplifier system." Lasers and Electro–Optics, 1999. CLEO/Pacific Rim '99. Aug. 30–Sep. 3, 1999, pp. 413–414.*

* cited by examiner

Primary Examiner—Jason Chan
Assistant Examiner—Christina Y Leung
(74) Attorney, Agent, or Firm—Nixon & Vanderhye P.C.

(57) ABSTRACT

A device and method for quantifying the amount of jitter experienced by an optical data pulse. During transmission data pulses may suffer jitter. Their arrival time at a node may be temporally offset from its predicted arrival time. Data pulses are timed so that they may be received at a detector disposed downstream of said node at a predetermined time. The device includes an optical AND gate, which has a first input arranged to receive a chirped pulse having a duration T, and whose wavelength varies in a monotonically over the duration of the pulse, the node having a second input arranged to receive a second data pulse. The node includes an optical gate arranged to generate an output pulse in response to the chirped pulse and the data pulse received at the first and second inputs, respectively, having a wavelength dependent upon the time at which the data pulse is received at the second input.

7 Claims, 9 Drawing Sheets

COMMUNICATIONS NETWORK

BACKGROUND OF THE INVENTION

1. Field of the Invention

The present invention relates to a communications network and to a method and device for assessing the amount of timing jitter experienced by data pulses in an optical communications network.

2. Related Art

It is known that optical fibre has a huge potential information-carrying capacity. For example, by utilising the entire gain bandwidth of erbium-doped optical amplifiers, a single fibre could carry more than 2 Tbit/s. However in the majority of telecommunications systems in commercial use currently, the information is carried over fibre in the form of an optical signal at a single wavelength. The data transmission bandwidth of the fibre is therefore limited by the electrical bandwidth of the transmitter and receiver, and this means that only a tiny fraction (a maximum of about 1%) of the potential bandwidth-carrying capacity of the fibre is being usefully exploited. There is therefore much interest currently in developing methods for increasing the transmission rate for point-to-point fibre links. One method is wavelength-division multiplexing (WDM), in which several data channels, at different wavelengths, are carried simultaneously on the same fibre. An alternative method for increasing the rate of information that can be carried on fibre is to use optical time-division multiplexing (OTDM) in which several data channels are multiplexed in the form of bit-interleaved return-to-zero (RZ) optical pulse trains.

The WDM approach to photonic networking has some very attractive advantages: in addition to the relative simplicity and commercial availability of the devices needed, WDM networks can be created in a wide variety of architectures with great flexibility (the main restriction being merely that any pair of photonic transmission paths cannot use the same wavelength on a shared fibre link). An advantage of WDM networks is that they can, in principle, support 'signal transparency', i.e. data signals can be carried using any modulation format. However, this implies that, in effect, WDM photonic networks are based on 'analogue' transmission. As a result it is not possible for digital signal regeneration techniques in the optical domain, to be used. The inability to perform signal regeneration in the optical domain leads to practical scaling limitations for WDM networks due to noise accumulation from optical amplifiers, crosstalk and nonlinearity. These factors restrict the number of network switching nodes through which signals can pass without fatal degradation. Currently, in reported laboratory experiments the maximum number of WDM switching nodes through which a signal can pass without regeneration is limited to around 10, which is a significant restriction in architecture and scalability. A feasible, though costly, solution currently being advocated by some equipment vendors is to sacrifice transparency, standardise the transmission format, and regenerate each wavelength channel individually at the outputs of WDM cross-connects. In effect, this is a hybrid arrangement using analogue switching together with channel-by-channel digital regeneration.

In the OTDM approach to photonic networking, the signals are carried in 'digital' format in the form of RZ optical pulses, allowing the use of digital signal regeneration techniques in the optical domain such as 3R (Re-amplify, Re-time and Re-shape) regeneration [Lucek J K and Smith K,Optics Letters, 18, 1226–28 (1993)] or soliton-control techniques [Ellis A D, Widdowson T, Electronics Letters, 31, 1171–72 (1995)]. These techniques can maintain the integrity of the signals as they pass through a very large number of nodes. For example, Ellis and Widdowson [Ellis A D, Widdowson T, Electronics Letters, 31, 1171–72 (1995)] have made a laboratory demonstration of error-free transmission of signals through an OTDM network consisting of 690 nodes in concatenation. Despite this impressive potential for scalability, however, the OTDM approach to photonic networking suffers from severe restrictions in the network architecture that can be used. This results from the need to maintain proper bit-level synchronism between all the signal sources, demultiplexers and channel add/drop multiplexers throughout the network.

The problems with the conventional techniques discussed above, are that in complex architectures, timing fluctuations of the data pulses in the arrival time of pulses at nodes (due to environmental effects acting on the fibres such as temperature change and mechanical strain) cannot be adequately controlled or compensated in a continuous uninterrupted fashion. This results in data pulses being lost. There are many causes of timing fluctuations that may result in data being lost. The first cause is jitter in the arrival time of the incoming packet data pulses. It is known that in high-speed optical transmission systems, jitter in the arrival time of pulses arises from effects such as amplified spontaneous emission noise, the soliton self-frequency shift arising from the Raman effect, soliton short-range interactions, and the complex interplay of these various processes. Other timing fluctuations include temperature dependent length changes in the fibre that cause the absolute arrival time of the optical pulses at a node to wander. This creates timing problems for demultiplexing the data at the node and for adding new local data to the optical stream. Techniques to provide synchronism at nodes and overcome this wander timing problem have been described using discrete wavelength conversion and dispersion compensation (K. S. Jepsen et al, Technical University of Denmark, ECOC '97 postdeadline) but this technique requires feedback to achieve synchronism. The limited bandwidth of such feedback control limits this technique to relatively slow timing changes and not pulse-to-pulse jitter.

Conventional techniques to compensate for timing fluctuations, such as jitter, rely upon a gate window being opened by the timing pulse when it reaches the node. The problem with this technique is that the gate window only has a finite duration, and if a data pulse is affected by jitter to the extent that it does not arrive within the gate window, it will be lost. One problem with these techniques is that there is no way of quantifying the amount of jitter experienced by a data pulse.

BRIEF SUMMARY OF THE INVENTION

The present invention provides a device for quantifying the amount of jitter suffered by an optical pulse, and overcomes some of the disadvantages of the prior art techniques discussed above.

In accordance with a first aspect of the present invention, there is provided a method of quantifying the amount of timing jitter experienced by an optical data pulse in an optical transmission system, the method comprising generating a chirped optical pulse whose wavelength varies monotonically over the duration of the chirped pulse, applying in synchronism with the notional unjittered arrival time of the optical data pulse, the chirped optical pulse to a first input of an optical AND gate, applying the optical data pulse to a second input of the optical AND gate to trigger the AND gate and to produce at the output of the AND gate an output optical pulse having a wavelength determined by the amount of jitter experienced by the data pulse with respect to said notional unjittered arrival time, and thereafter detecting the wavelength of the optical output pulse to achieve a measure of the amount of jitter.

According to a second aspect, there is provided a device for quantifying the amount of jitter suffered by an optical pulse in an optical transmission system, comprising an optical AND gate having an output and first and second inputs, the first input of the AND gate being connected to a source of chirped optical pulses, whose wavelength varies in a monotonic manner over the duration of said chirped pulses, wherein when one of said optical pulses is received at the second input while one of the chirped pulses is present at the first input, the AND gate is triggered to produce an output optical pulse whose wavelength is determined by the amount of jitter in the optical trigger pulse, said device, so that for a given jitter delay a corresponding output optical pulse is generated having a given wavelength, said device further comprising a wavelength detector for detecting the wavelength of said output pulses, and means for quantifying on the basis of the detected wavelength the amount of jitter suffered by the respective optical trigger pulses.

Thus, in accordance with a first and second aspects of the invention, provided the optical signal arrives at the node during the period the chirped pulse arrives at the node, the output pulse generated at the node has a wavelength indicative of the amount of jitter suffered the optical pulse on arrival at the node.

The device of the present invention is compatible with other optical devices such as optical regenerators and bit-serial optical processing devices.

BRIEF DESCRIPTION OF THE DRAWINGS

In order that the invention may be more fully understood embodiments thereof will now be described by way of example, and by way of contrast with a prior art device as previously described, reference being made to the accompanying drawings in which.

DETAILED DESCRIPTION OF EXEMPLARY EMBODIMENTS

Figure 3:
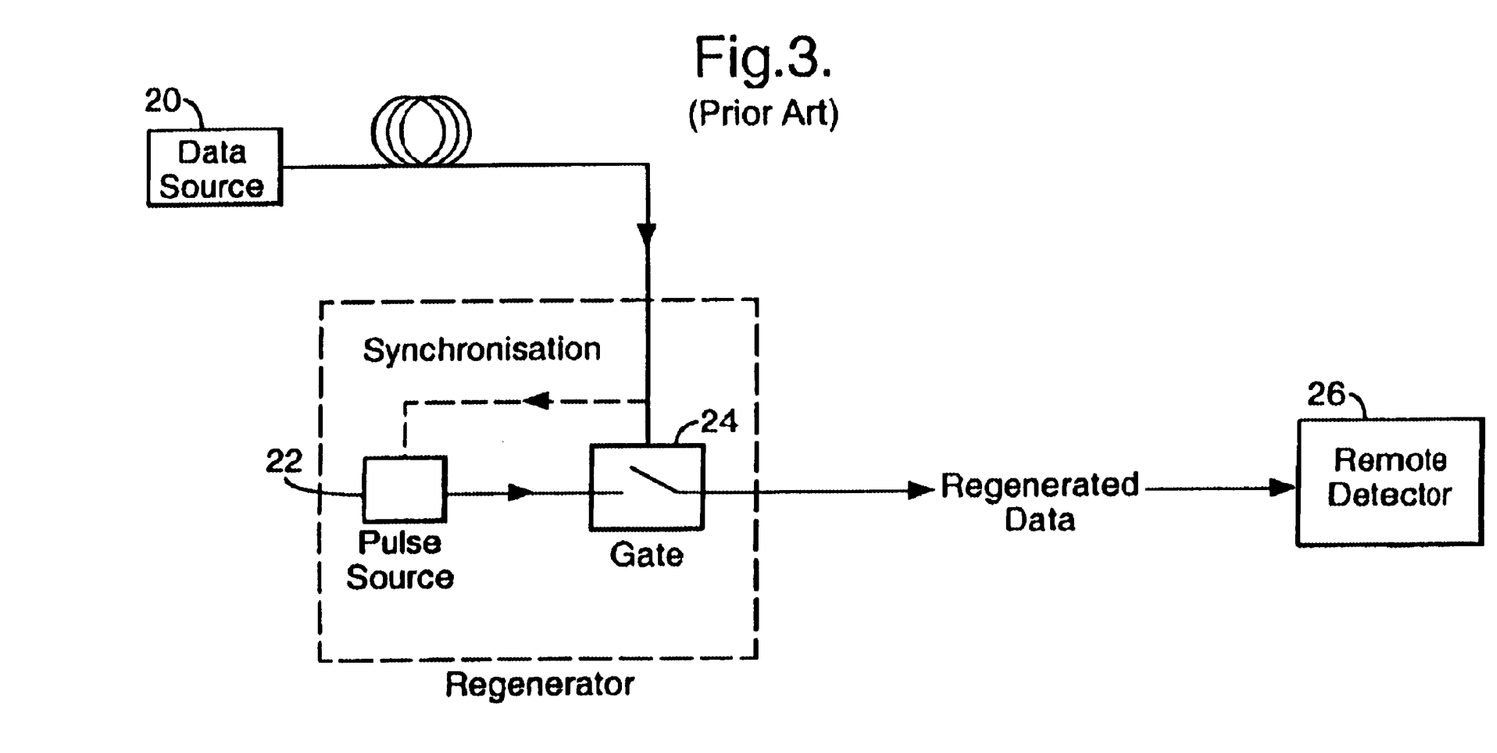
FIG. 3: shows a depiction of a prior art timing technique.

FIG. 3 shows a prior art approach to correcting timing fluctuations of a digital data stream consisting of a RZ (return to zero) pulse train encoded by on-off modulation ("mark" represents a bit value 1, "space" represents 0). The incoming data bits from a distant source 20 are used to modulate using a gate 24, a continuous train of RZ pulses produced by a local source 22, thus regenerating the original data to be detected at remote detector 26. The presence of a "mark" in the incoming data stream causes the gate to open for a time of the order of the bit period, allowing a single pulse from the local source 22 to pass through. In this way the regenerated bits are provided by the local source and hence their pulse shape, spectral quality, amplitude and timing stability are determined by the properties of the local source 22. The pulse repetition rate of this local source 22 is the same as the nominal bit rate of the incoming data. The key problem in designing such a regenerator is to ensure that the incoming data stream and the locally-generated pulses are maintained in synchronism.

Figure 1:
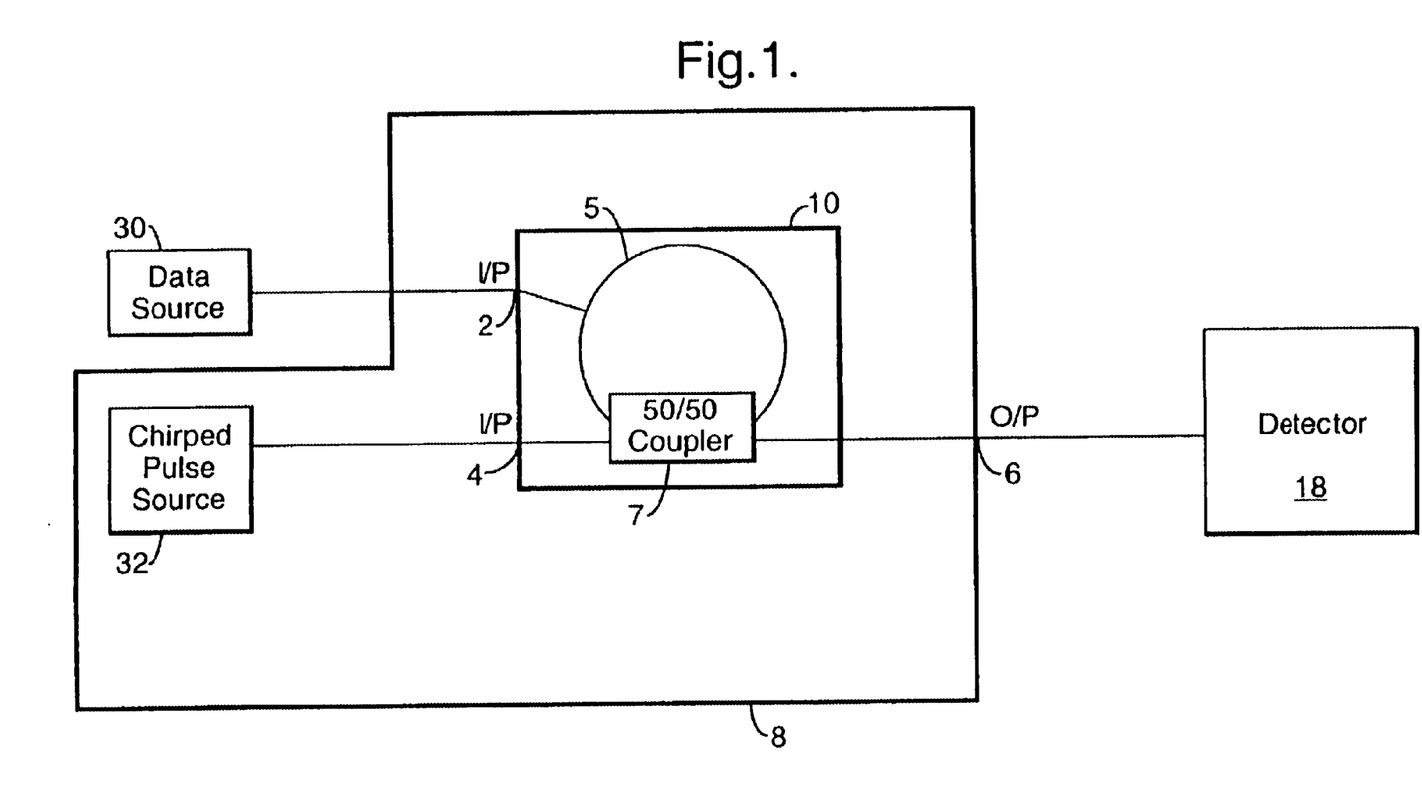
FIG. 1: shows a device for quantifying the amount of jitter suffered by an optical pulse according to a first embodiment of the present invention.

FIG. 1 is a simplified outline diagram showing a system including a device 8 for quantifying the amount of timing jitter experienced by an optical data pulse. The system includes an optical data source 30. The optical data source includes a source of optical RZ pulses at a repetition frequency of, for example 10 GHz, whose output is modulated and multiplexed in a fashion similar to that used for OTDM (e.g. the output from the pulse source 30 is split into parallel paths which are individually encoded with data by on-off modulation at a particular rate and then recombined by bit-interleaving to form a packet of data bits with a composite rate). The source of pulses at the particular rate could consist of an electronic microwave oscillator oscillating at the same rate which drives an electrically-synchronised laser (such as a gain-switched laser or an actively mode locked laser). Alternatively, it could be a continuously free-running optical pulse source, such as a passively-mode locked laser or a mode locked ring laser, whose nominal repetition frequency is set (for example, by tuning the laser cavity length) to the particular rate.

The device 8 for quantifying an amount of jitter experienced by an optical data pulse includes a chirped pulse source 32 for generating chirped pulses. The chirped pulses have a duration T, and have a wavelength which varies in a predetermined monotonic manner over the duration T of the chirped pulse. The significance of the montonic variation is explained below. The source 32 provides a source of RZ chirped pulses which is continuously free-running. It is independent from the data pulse source 30. The chirped pulse source 32 can be either one which is part of the node, or one that is local to one node, but not part of the node, or remote from the node. Where the chirped pulse source is remote from a node a single source could be shared between multiple nodes, although a source may be shared between several nodes and still be part of one of the nodes.

Figure 5:
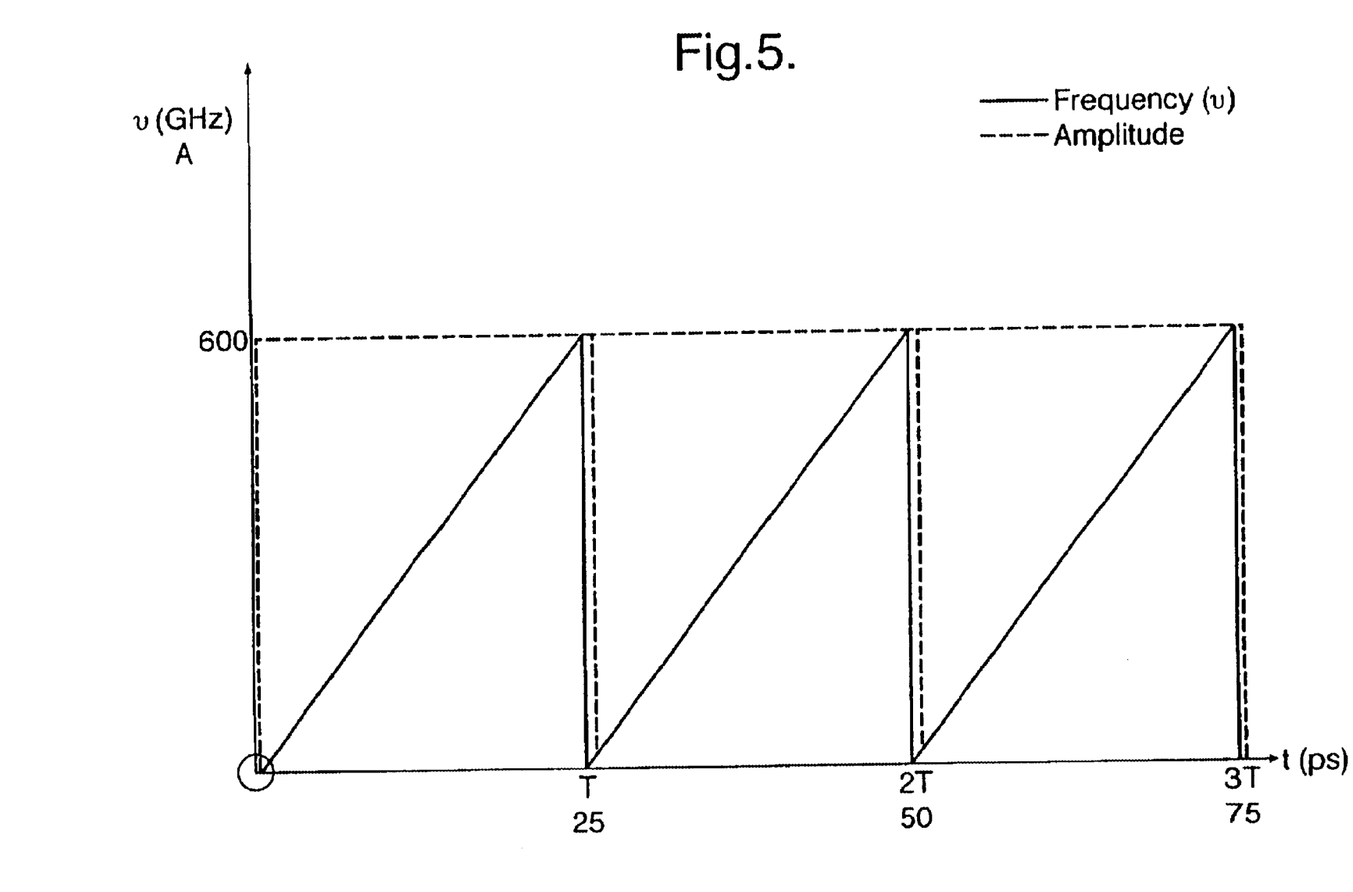
FIG. 5: shows a plurality of chirped pulses
Figure 6:
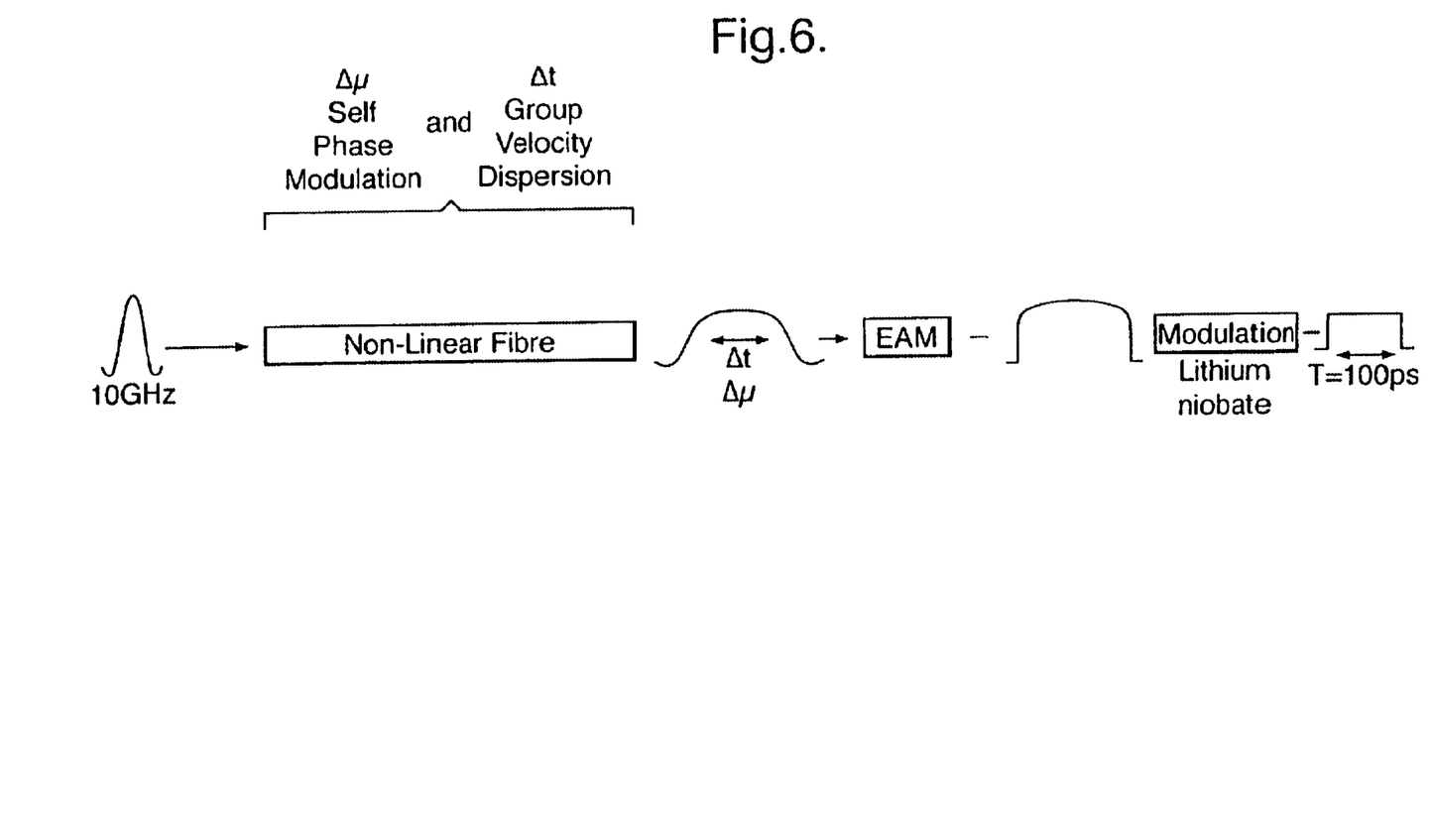
FIG. 6: shows a representation of how the chirped pulses are generated.

FIG. 5 shows the frequency characteristics of the chirped pulses and FIG. 6 outlines the generation of the chirped pulses. These aspects are discussed below. The period of the chirped pulses is controllable. Also, the frequency distribution which makes up the chirped pulses is controllable. The period of the chirped pulses is selected for example depending on the data rate of the data pulses input to the device at the node, or the switching rate at which the node in the device is operating. The frequency distribution is selected depending on, for example, the sensitivity of a detector 18. For example, the chirped pulses generated as shown in FIGS. 5 and 6 have a duration T of 25 ps, and have a frequency distribution from 0 to 600 GHz. Depending on the particular situation, the period and frequency distribution are controlled and selected as being appropriate to the situation, but during operation of the system, it is preferable that there is no variation.

For example, chirped pulses may be generated having a duration of approximately 100 ps for a data rate of 10 Gbit/s, and may be passively multiplexed to form a continuous stream of pulses. Thus, the time between successive chirped pulses in these examples is substantially zero. It is of course, not essential for there to be no interval between the pulses. Further, for example, where T is the nominal bit period in the optical packet, if T=10 ps, 1/T=100 Gbit/s. Depending on the application, the chirped pulses may have other characteristics. For example, for asynchronous demultiplexing, if it is desired to demultiplex, for example by taking out a data channel at a lower rate, a chirped pulse stream comprising spaced chirped pulses may be used. For example, a chirped pulse stream in which each chirped pulse has a duration of 25 picoseconds, and a spacing between chirped pulses of 100 picoseconds. This arrangement has the advantage of enabling the clock to be recovered more easily using such spaced signals than with a continuous stream without a significant interval between pulses.

For chirped pulse streams without significant gap between pulses, although it is not essential that the bit rate of the data source and the chirped source are the same, it is preferable that they lie close to the same nominal value, 1/T, where T is the nominal bit period. How close the bit rate of the data source and the chirped source will lie depends on the packet length. The time within which a packet may become offset depends on the number of packets and the bit rate variation in the system.

The node 10 is configured as or includes an optical gate 12, which performs an AND gate function. The optical gate may be implemented in many different ways. For example, for ultrafast operation, the gate 12 could be a nonlinear optical device such as a fibre loop mirror (as described, for example, by Whitaker et al in Optics Letters, vol. 16, page 1840 (1991)), in which case the gate width is defined by selecting a suitable fibre length, dispersion and birefringence. Alternatively a suitable ultrafast gating device based on the nonlinearity in semiconductor optical amplifiers could be used (as described, for example, by Kang et al in the International Journal of High Speed Electronics and Systems, vol. 7, page 125 (1996)). In this case the gate width may be determined by the positioning of the amplifier in a Sagnac interferometer loop arrangement, or by the relative offset of two amplifiers in a Mach-Zehnder interferometer device. Another suitable ultrafast semiconductor-based device is the ultrafast nonlinear interferometer switch described by Hall and Rauschenbach (paper PD5, Proceedings of Conference on Optical Fiber Communication OFC'98, published by the Optical Society of America, February 1998), which has been shown to operate at a speed of 100 Gbit/s. For operation at lower speeds, for example, an optoelectronic device such as an electroabsorption modulator could be used as the gate. In that case, the incoming packet data bits must first be received by a photodetector whose output is converted to a suitable short electrical pulse to drive the modulator, and the gate width is defined by the width and amplitude of this electrical pulse. In this case, for correct operation it is necessary that the photodetector and associated electronics can fully resolve the data bits, which limits the packet data rate. The AND gate function can also be achieved by four-wave mixing (FWM) in an optical fibre or semiconductor optical amplifier. Other techniques include optical cross-correlation in a nonlinear crystal or two-photon absorption in a semiconductor.

Figure 2:
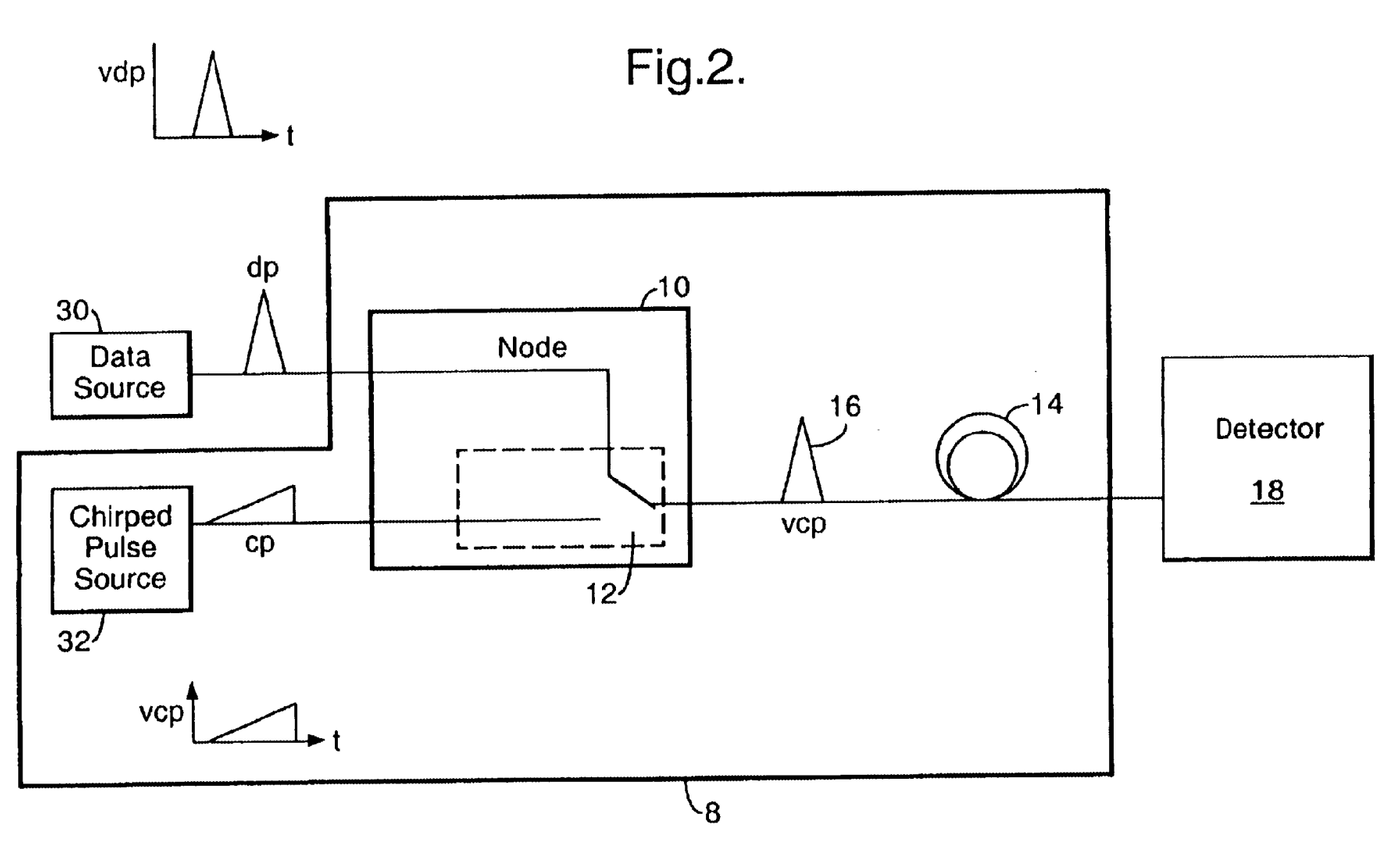
FIG. 2: shows a device for quantifying and correcting the amount of jitter experienced by a data pulse, including the data pulse, the generated pulse and the output pulse.

FIGS. 1 and 2 illustrate how the device 8 for quantifying the amount of jitter experienced by an optical data pulse fits within the system. Chirped pulses are generated within the device at the source 32. Optical data pulses dp are generated at a remote source 30. The device 8 includes a node 10 having first and second inputs 2, 4. The data pulse dp is received at a second input 2 of the node 10. The chirped pulse cp is received at the first input 4 of the node. When the data pulse dp is present at the second input 2 of the node 10 and a chirped pulse cp is present at the first input 4 of the node 10, the node 10 is arranged to generate an output pulse at the output 6. The data pulse dp triggers the node, and operates on the chirped pulse cp arriving at the first input 4 of the node 10. The first and second inputs 2, 4 and the output 6 of the node define a gate 12. The gate 12 performs an AND gate function. The operation of the triggering data pulse dp on the chirped pulse cp through the optical AND gate 12, has the effect of selecting a segment from the chirped pulse. For example, as shown in FIG. 1, with a NOLM (non-linear optical loop mirror) all-optical switch 5, the chirped pulses are input to a 50:50 coupler 7 at the input to the loop and propagate around the fibre of the loop such that they interfere constructively back at the coupler of the NOLM and are directed back to the NOLM input. However, when the data pulses are introduced into the loop via a second fibre coupler (not shown), the segment of the chirped pulse which propagates with the data pulse (which is shorter in duration than the chirped pulse) experiences a nonlinear phase shift via cross-phase modulation. The nonlinearity is instantaneous (i.e. the nonlinearity responds to the time varying amplitude of the light electric field), so the data pulse does not affect the other parts of the chirped pulse. The segment is selected because the nonlinearity is instantaneous and it is only those frequencies of the chirped pulse cp that travel at the same group velocity as the data pulse within the fibre that interact with the data pulse dp. This results in only that part of the chirped pulse which has interacted with the data pulse being transmitted at the output of the interferometer.

When the chirped pulse interferes back at the 50:50 coupler, there is now a segment of the chirped pulse which has interacted with the data pulse. As a result that segment of the chirped pulse has the differential phase shift. A differential phase shift of pi radians has the effect of directing the chirped segment that has interacted with the data pulse to the output port of the NOLM.

Depending on the particular arrangement, the selected segment can have the same pulse shape and amplitude as the data pulse. However, this is not necessary. The optical gate can be chosen to vary any of these properties of the generated pulse. However, because the chirped pulse cp comprises a variable frequency range, the wavelength of the selected segment is determined in accordance with where the data pulse falls within the duration of the chirped pulse. It will be understood that the selected segment will comprise a small range of discrete wavelengths corresponding to those falling within the part of the chirped pulse that has been selected, depending on the part of the chirped pulse with which the data pulse interacts.

Thus, the wavelength of the pulse 16 output from the gate 12 is dependent upon the temporal offset of the data pulse dp with respect to the chirped pulse cp. This arrangement provides the advantage that regardless of the fluctuation of the arrival time of the data pulse, provided that it arrives during the presence of a chirped pulse, it will always operate on a portion of the chirped pulse to produce an output pulse whose wavelength is indicative of the amount of jitter experienced by the data pulse. In order to quantify the amount of jitter experienced by the optical pulse, the pulse 16 output from gate 12 is fed to a wavelength detector 18. The detector may, or example, be a commercially available optical spectrum analyser. The optical spectrum analyser, depending on the type, includes an input fibre, slits on which the light whose wavelength or wavelengths is to be determined is incident. The slits cause the light to interfere. Disposed behind the slits is some imaging optics and a rotatable Bragg diffraction grating. The Bragg diffraction grating disperses the wavelength components of the incident light. Which wavelength is dispersed will depend on the angle at which the Bragg diffraction grating is rotated to. Thus, by measuring the angles at which light is dispersed to by the Bragg diffraction grating, the wavelength of the input light can be determined. The detector 18 is selected to be able to detect over the wavelength range of the chirped pulse. The device for quantifying the amount of jitter experienced is calibrated so that for a given jitter, a given wavelength segment of the chirped pulse will be output from the gate 12. The detector 18 detects the output pulses and measures their respective wavelengths. As mentioned above, the chirped pulses have a duration T, and have a wavelength which varies in a predetermined monotonic manner over the duration T of the chirped pulse. It is necessary to be able to establish how the wavelength varies over the duration of the chirped pulse in order to quantify the amount of jitter experienced by a data pulse. Also it is necessary that the wavelength varies monotonically, i.e. it either increases or decreases over the duration of the pulse. This excludes the possibility that a data pulse having experienced an amount of jitter tj triggers the AND gate to output a pulse having a wavelength lambda tj, that a data pulse having experience a different amount jitter, also triggers the AND gate to output a pulse having wavelength lambda tj. Thus, for each amount of jitter experienced, the AND gate is triggered to output a pulse having a wavelength indicative of each amount of jitter, This is the consequence of the chirped pulse having a wavelength which varies monotonically over the duration T of the chirped pulse input to the AND gate. Thus, by comparing the measured wavelength of the pulse detected at detector 18 with the calibrated measurements, the amount of jitter suffered by the pulse is quantified.

Having determined the amount of jitter suffered by the optical pulses, this can be used as a diagnostic tool to identify causes of jitter in the optical system. For example, a systematic jitter may be indicative of a localised temperature disturbance in the system. Thus, the measure of jitter is used to provide a control signal to control a feed back loop operative on one or more elements of the transmission system to reduce the amount of timing jitter.

The device for quantifying the amount of jitter may include an optically dispersive medium 14 which subjects the output pulse from the gate to a delay which depends upon the wavelength of the output pulse, so that the output pulse arriving at the remote detector 18 is substantially jitter free on arrival at the detector 18. The optically dispersive medium 14 includes a dispersion compensation medium such as a length of dispersion compensated optical fibre or a grating. The optically dispersive medium is selected to have a dispersion profile appropriate for the wavelength profile of the chirped pulse. For example, for a chirped pulse having a wavelength profile whose wavelength varies linearly over time during the duration of the pulse, a dispersion compensating fibre will be selected bearing in mind the wavelength variation in the chirped pulse, wherein the lower frequency components travel slower in the fibre than the higher frequency components. The dispersion compensated fibre is selected, so that after an optimum fibre length, which can be determined either theoretically or experimentally, all wavelength components of the chirped pulse will overlap in time, so that they arrive at the remote detector 18 at the substantially the same time.

It will be appreciated that the different wavelengths comprised in a pulse having been transmitted along a non-dispersion compensated length of optical fibre will arrive at different times at a detector, since each wavelength is subject to a different degree of dispersion. The effect of subjecting the generated pulse to appropriate dispersion compensation is to temporally "squeeze" the generated pulse, so that regardless of its constituent wavelengths, all constituent wavelengths of the pulse will arrive at a detector at the same time.

The optimum dispersion compensating fibre length thus has the effect of compressing the temporal duration of all wavelength components within the generated pulse. The optimum dispersion compensation is determined by selecting the fibre length to give the shortest temporal duration of output pulse. In practice, this could be calculated theoretically from the fibre and chirped pulse parameters. Alternatively, the correct fibre length can be determined by coupling the output to a variety of dispersion compensating fibres of varying lengths and by selecting the length that provides the shortest output pulse.

In this way, the dispersion compensation means 14 is selected, for example by varying the length of dispersion compensated fibre, so that the arrival time of the pulse output can be set and the pulse duration can be minimised regardless of the wavelength of the pulse output by the gate. Thus, the advantage of this arrangement is that any pulse outputted by the gate will arrive after a predetermined time at the detector 18.

It is thus appreciated, that the pulse arriving at the node 10 may suffer severe jitter, yet pulses arriving at the detector 18 arrive substantially jitter free. In this way the amount of jitter experienced by a data pulse is quantified and corrected.

Figure 4:
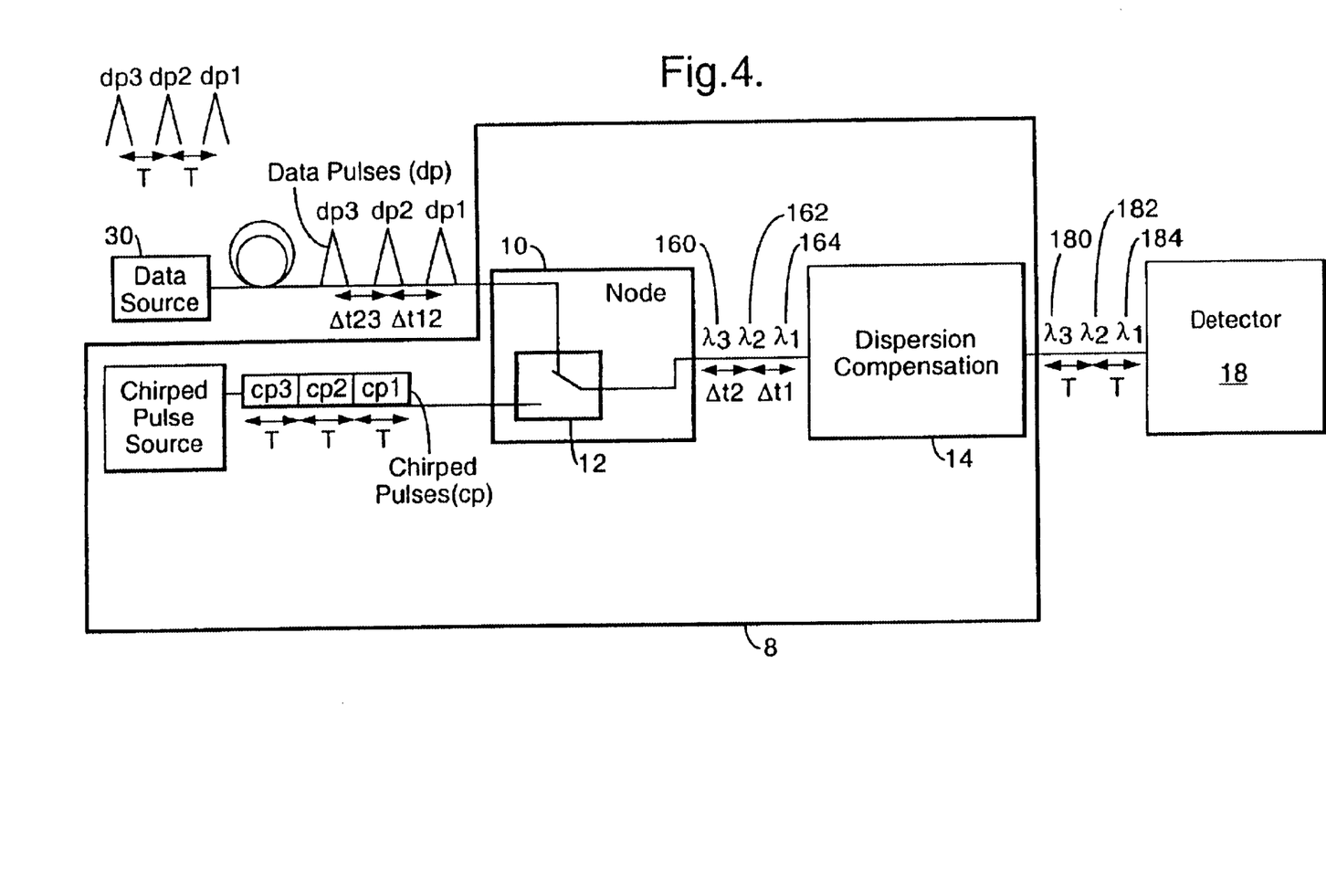
FIG. 4: shows a device for quantifying and correcting the amount of jitter experienced by a stream of data pulses.

FIG. 4 shows a device for quantifying and correcting for jitter experienced by data pulses. In particular, FIG. 4 shows how a plurality of pulses which may have suffered timing fluctuations are corrected for any timing fluctuations so that they arrive at the detector 18 equally spaced in time. The device shown in FIG. 4 works according to the same principle as described with respect to FIGS. 1 and 2. According to FIG. 4 a plurality of optical data pulses dp1, dp2, dp3 produced by data source 30, reach a remote node 10 having suffered timing fluctuations. For example dp1 and dp2 are temporally displaced by a time delta t12, and dp2 and dp3 are temporally displaced by a time delta t23. Each data pulse dp1, dp2, dp3 in the node 10 operates on respective chirped pulses cp1, cp2, cp3. The time between each successive generated chirped pulse may be substantially zero. In cases where there is spacing between successive chirped pulses, the spacing is equal. The output of the node comprises three pulses 160, 162, 164, lambda1, lambda2 and lambda3, so that although the pulse shape of these pulses is the same as their corresponding data pulses, their wavelength or wavelength range depending on the wavelength profile of the chirped pulse, as discussed above is dependent upon the temporal offset of each pulse with respect to the chirped pulse.

After leaving the node 10 pulses 160, 162, 164: lambda1, 2 and 3, are nevertheless still subject to time fluctuations delta t12 and delta t23 with respect to each other. The delay means 14 preferably includes dispersion compensation means 14 which disperses pulses 160, 162, 164 in accordance with their wavelengths respectively, so that the pulses 180, 182, 184, having wavelengths lambda1, 2 and 3, respectively, arrive equally spaced in time at the remote detector 18.

FIG. 5 shows, in the solid lines, a plurality of chirped pulses. The frequency characteristic of the pulses is that of a saw tooth with respect to time. FIG. 5 depicts chirped pulses that vary monotonically over the duration T of the chirped pulse. The pulses shown in FIG. 5 have a frequency which increases linearly. Hence, the wavelength decreases linearly over the period of the pulse. However, there is no reason why non-linearly chirped pulses may not be used provided that it varies monotonically and in a predetermiend manner, in order for the detection calibration to be carried out, so that the relationship between the wavelength of the detected pulse output from the AND gate and the amount of jitter experienced by the data pulse can be established and taken into account in the calibration of the device. It will be appreciated that, in order to calibrate the detector for a nonlinearly chirped pulse, the relationship between the wavelength of the pulse output from the AND gate and the amount of jitter experienced by the data pulse must be determinable.

The dotted lines on FIG. 5 gives a schematic indication of the amplitude of successive chirped pulses. A succession of chirped pulses are generated according to the method described below. The pulses are preferably square shaped, having a sharp rise time and fall time. The duration of the pulses T is chosen to be appropriate for the incoming data rate (1/T) e.g. 25 ps for a data rate of 40 Gbit/s. The frequency chirp is preferably linear across the chirped pulse with a frequency variation of 600 GHz for a 25 ps chirped pulse.

However, it is envisaged that, depending on the data rate of the incoming data pulses and the application, chirped pulses having other characteristics would also be used.

Chirped pulses as such are known. For example, Uchiyama K, Takara H, Morioka T, Kaweanishi S and Saruwatari M, Electronics Letters. Vol 32, No. 21, 10$^{th}$ October 1996, discloses the use of chirped pulses for the different application of converting TDM signals (time division multiplexing) to WDM signals (wavelength division multiplexing).

FIG. 6 shows one example of how chirped pulses are generated. A mode locked laser is used to generate optical pulses at 10 GHz at a predetermined wavelength. The laser output is fed into a length of non-linear optical fibre with normal dispersion, such as Sumitomo fibre 788-6902-03. Whilst propagating in the length of non-linear optical fibre the pulses undergo self phase modulation which has the effect of broadening the frequency spectrum of the light within each pulse by an amount deltav. The frequency spectrum of the chirped pulses can be controlled by selecting characteristics of the non-linear fibre use, in particular its length and/or composition and/or construction. Further, the input power to the fibre can also be varied to change the nonlinear broadening effect, since the broadening is proportional to the peak power of the input optical pulse.

Whilst undergoing frequency spectrum broadening, the duration T of the pulses is also controlled by the dispersion of the fibre. The duration T can be increased by dispersing the spectrum broadened pulses into the length of non-linear fibre. Whilst propagating in the length of ordinary fibre the pulses undergo group velocity dispersion. This has the effect of increasing the duration of the pulses by an amount deltat. The amount of increase of duration, deltat, is controlled by the dispersion experienced by the pulse which is controlled by varying the length and/or the composition of the non-linear optical fibre. The duration is chosen depending on the particular application. This will depend for example, on the data rate of the data pulses. For example, for a data rate of 10 GHz, a duration for the chirped pulses of 100 ps is preferred.

The output from the length of non-linear are chirped pulses broadened both in terms of their frequency spectrum, deltav, and their duration T, by amount deltat. Depending on the application, two subsequent modulation stages can be carried out, for example, to further shape the chirped pulses. Electroabsorption modulation removes the edges to reduce the rise time of the pulses. In a further modulation stage, the intensity of the pulses is modulated. In particular, the peaks of the chirped pulse are selectively attenuated. This has the effect of flattening the top of each chirped pulse. This can be done for example, using a lithium niobate modulator. It can be understood, that by using the method described above, the characteristics of the chirped pulses can be varied. For example, the pulse duration can be varied by selecting the characteristics of the ordinary fibre used, in particular, its length and composition.

Figure 7:
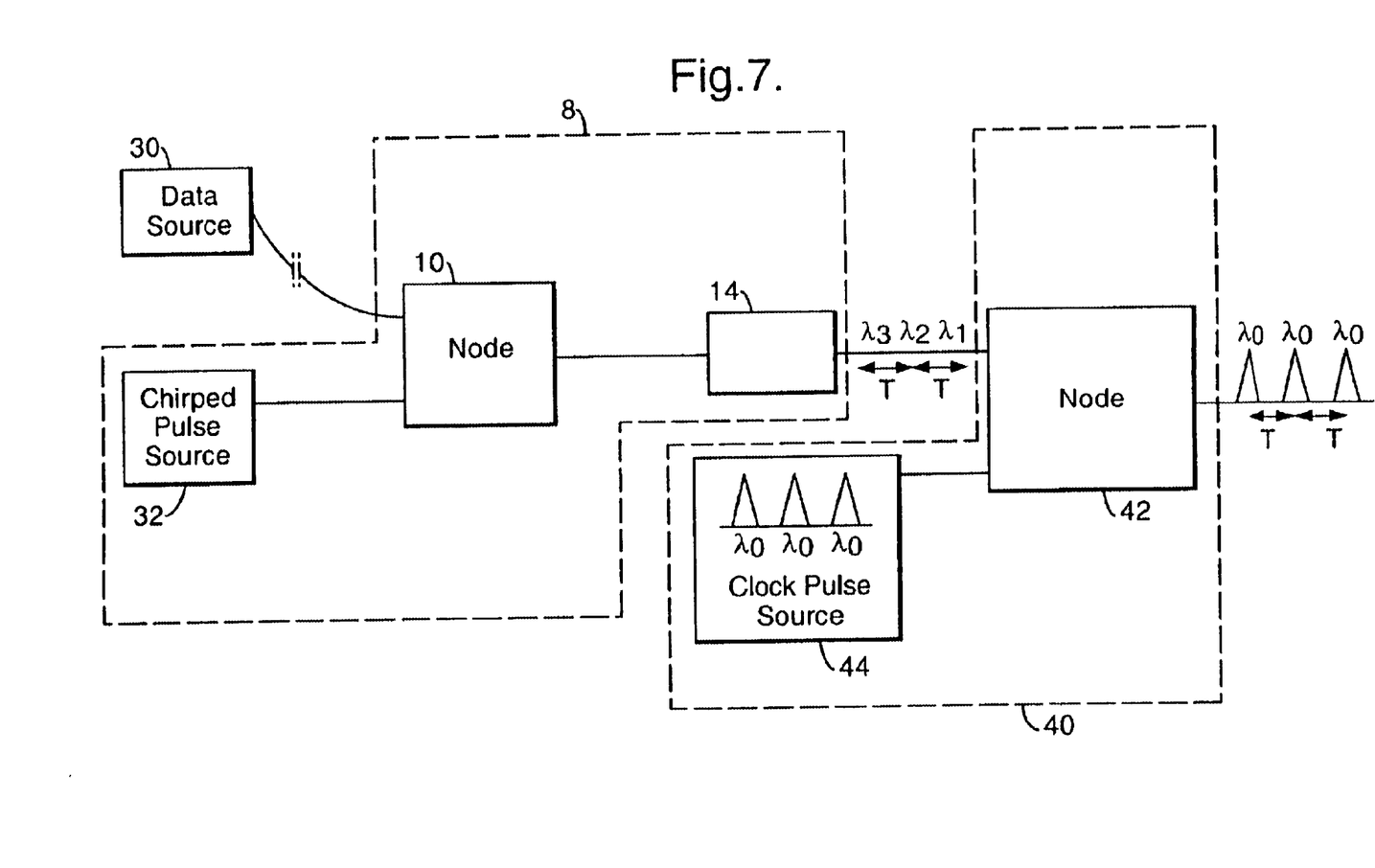
FIG. 7: shows a regenerator including a device according to the first embodiment of the present invention.

FIG. 7 shows a regenerator 40 including a device 8 shown within the dotted lines, according to the first embodiment of the present invention. The device 8 for correcting for timing fluctuations suffered by data pulses has application as a prestage for a regenerator 40, such as those regenerators disclosed in our pending application GB99/01159. As can be seen from FIG. 7, the output from the device 8, which comprises equally spaced pulses T of differing wavelengths lambda1, lambda 2 and lambda 3 etc, is input to a further node 42 comprising a further AND-gate 42. A local optical clock stream 44 is also input to the AND-gate 42. The pulses lambda 1, 2 and 3, operate on the clock pulses to generate regenerated optical pulses lambdat0 having the same pulse shape, spectral quality, amplitude and timing stability as the local source 44 of the stream above. Because the input pulses of lambda1, 2 and 3 have equal temporal spacings, it greatly reduces the switching window requirement at node 42 to accommodate the effects of jitter and maintain an acceptable bit-error rate (BER). For example, with a switching rate of 10 GHz and a window width of 75 ps, if the jitter is reduced from 3 ps rms to 1.8 ps rms with the chirped pulse retimer then the BER improves from 1 in $10^6$ to 1 in $10^{12}$ respectively.

The device of the present invention when incorporated as a pre-stage to a regenerator further reduces the number of gates necessary to achieve robust regeneration. Thus, the apparatus necessary to correct for timing fluctuations and retime and regenerate a data signal or stream of data signals is simplified. FIG. 6 depicts a regeneration device incorporating an all optical asynchronous regenerator as disclosed in our pending application GB99/01159. A regenerator of this type must be designed to regenerate correctly each data signal regardless of the phase difference between the data signal and the local clock. An error free regeneration cannot be completely guaranteed using a single gate. It has been found that even for an ideal square switching window having a duration equal to the period of the data pulses, there exists a small chance that the data pulse falls at the edge of the switching window. If a data pulse were to fall directly between two switching windows, there is a chance that it may be lost. To overcome this problem, our pending application GB99/01159 discloses a regenerator comprising two or more gates, in which the switching windows are provided so that each gate is able to regenerate correctly a data pulse falling within a restricted phase shift range, however, the two or more gates together span the entire possible phase shift range of zero to two pi. By monitoring the gate outputs, the regenerator selects a correctly regenerated output from one of the gates in each time slot. The simplest multiple gate regenerator is a dual gate asynchronous burst regenerator. However, although the bit error rate of the dual gate regenerator is lower than for the single gate regenerator, it has been found that despite adding complexity to the system, a quad gate regenerator provides a more robust solution. A quad gate regenerator's performance is more robust than a dual gate regenerator because the quad gate regenerator can tolerate a higher level of jitter. The reason for this is that, in the case of the quad gate regenerator, the local clock pulses modulated by a correctly selected gate are positioned further from the edges of the gate window for all possible phase shifts. The disadvantage of the quad gate regenerator, however, is that it requires more gates, and is thus more complex.

However, if the timing fluctuation correction device of the present invention is added to the front end of a regenerator, as shown in FIG. 6, jitter is compensated for as discussed above, prior to regeneration. Thus, if the timing fluctuation correction device of the present invention is added to a regenerator, robust regeneration can be achieved with a dual gate regenerator. This arrangement reduces the total number of gates necessary for regeneration and greatly simplifies the regenerator apparatus whilst maintaining a high level of robust performance.

Figure 8:
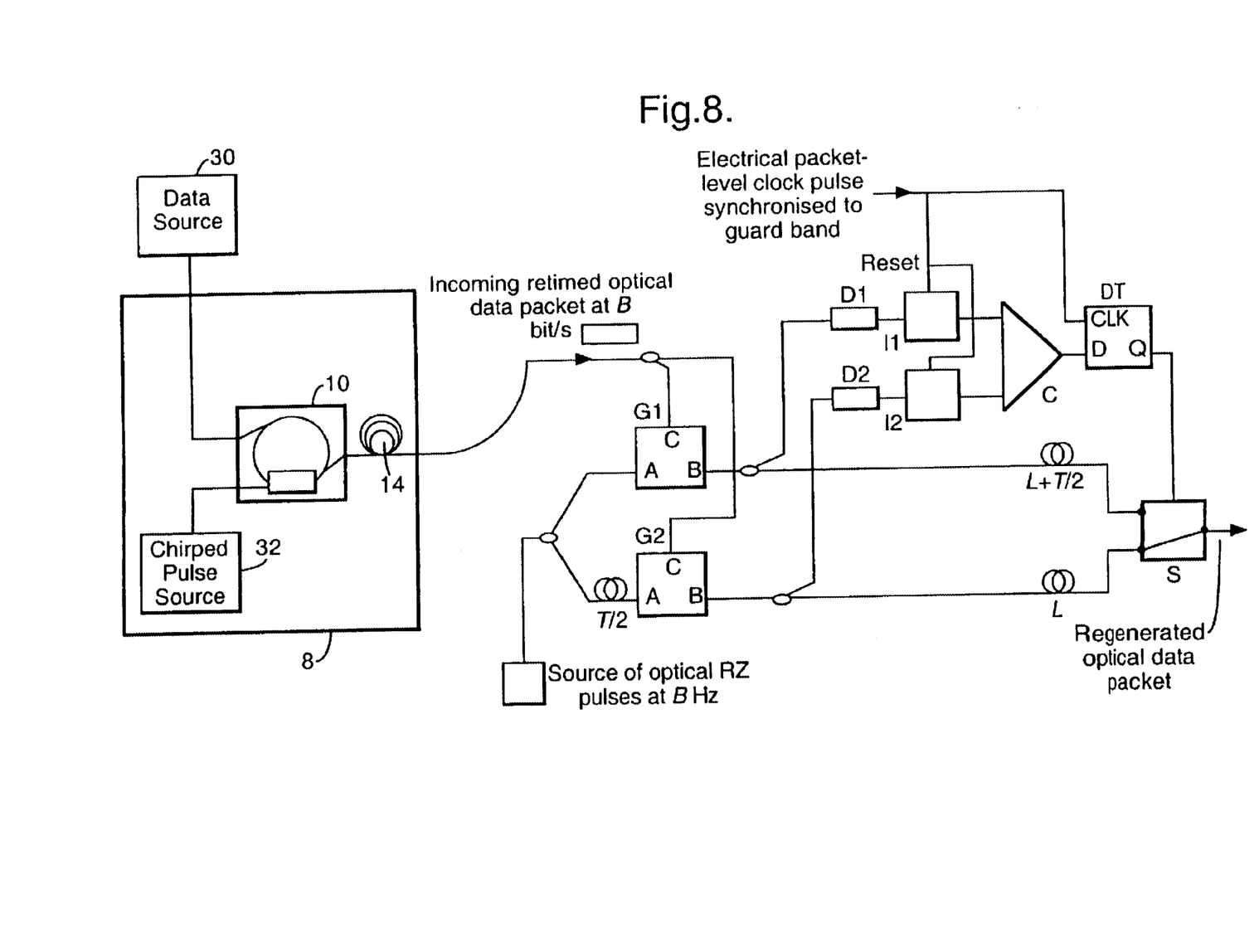
FIG. 8: shows a dual gate bit-asynchronous regenerator with which a device according to the first embodiment of the present invention may be incorporated.

FIG. 8 depicts the preferred dual gate bit asynchronous optical packet regenerator in which the timing fluctuation correction device of the present invention may be incorporated. The data bits in the incoming packet are used to control the opening of two gates, G1 and G2. A data bit with value 1 ('mark') causes each of the two gates to open for a fixed time duration (the gate window), otherwise the gates remain closed. It is preferable, though not essential, that the widths of the time window for gates G1 and G2 are equal. The output from the local clock (a continuous free-running source of optical RZ pulses at a repetition frequency nominally equal to the packet bit rate 1/T) is applied to the inputs of the two gates, one of these inputs being delayed relative to the other by an amount T/2. Since the phase θ of the local clock pulses relative to the packet data bits has an arbitrary and unknown value in the range $0 \leq \theta < 2\pi$, it is necessary that the gate window widths are chosen so that, whatever the value of θ, the clock pulses will be correctly modulated by at least one of the two gates. In the case that the window widths for gates G1 and G2 are equal, the window width W must therefore lie in the range T/2<W<T. The lower limit ensures that at least one clock pulse will be modulated at any value of θ, whilst the upper limit comes from the requirement that no more than one clock pulse may pass though the gate whilst the window is open. These upper and lower limits on W apply strictly in the case that the incoming data pulses and local clock pulses are sufficiently narrow that, on the time scale of a bit period, they may be represented by delta impulses. When finite pulse widths are taken into account the acceptable range of window widths is somewhat narrower than T/2<W<T. At present, it will be assumed that the data pulses and local clock pulses are short pulses, and for the remainder of this sub-section it is taken that W=3T/4 for both gates.

It should be noted at this point, with reference to FIG. 7, that there is an alternative and equally valid configuration in which the T/2 delay line is removed from the input port A of one of the gates, and placed instead at the control port C of one of the gates. The operation of the regenerator is very similar in this case, and the predicted performance described later is the same. Throughout the remainder of this description, the configuration will be assumed to be that in which the packet data bits are connected directly to the control ports of the gates, and the input ports have certain differential delays (as illustrated in FIG. 7 for a dual-gate regenerator). The optical gates may be implemented in different ways, and may be the same as those discussed above with respect to the retiming device of the present invention. For example, for ultrafast operation, the gate could be a nonlinear optical device such as a fibre loop, in which case the gate width is defined by selecting suitable fibre length, dispersion and birefringence. Alternatively a suitable ultrafast gating device based on the nonlinearity in semiconductor optical amplifiers could be used. In this case the gate width may be determined by the positioning of the amplifier in a Sagnac interferometer loop arrangement, or the relative offset of two amplifiers in a Mach-Zehnder interferometer device. Another suitable ultrafast semiconductor-based device is an ultrafast nonlinear interferometer switch, which has been shown to operate a speed of 100 Gbit/s. For operation at lower speeds an optoelectronic device such as an electroabsorption modulator could be used as the gate. In that case, the incoming packet data bits must first be received by a photodetector whose output is converted to a suitable short electrical pulse to drive the modulator, and the gate width is defined by the width and amplitude of this electrical pulse. In this case, for correct operation it is necessary that the photodetector and associated electronics can fully resolve the data bits, which limits the packet data rate.

Figure 9:
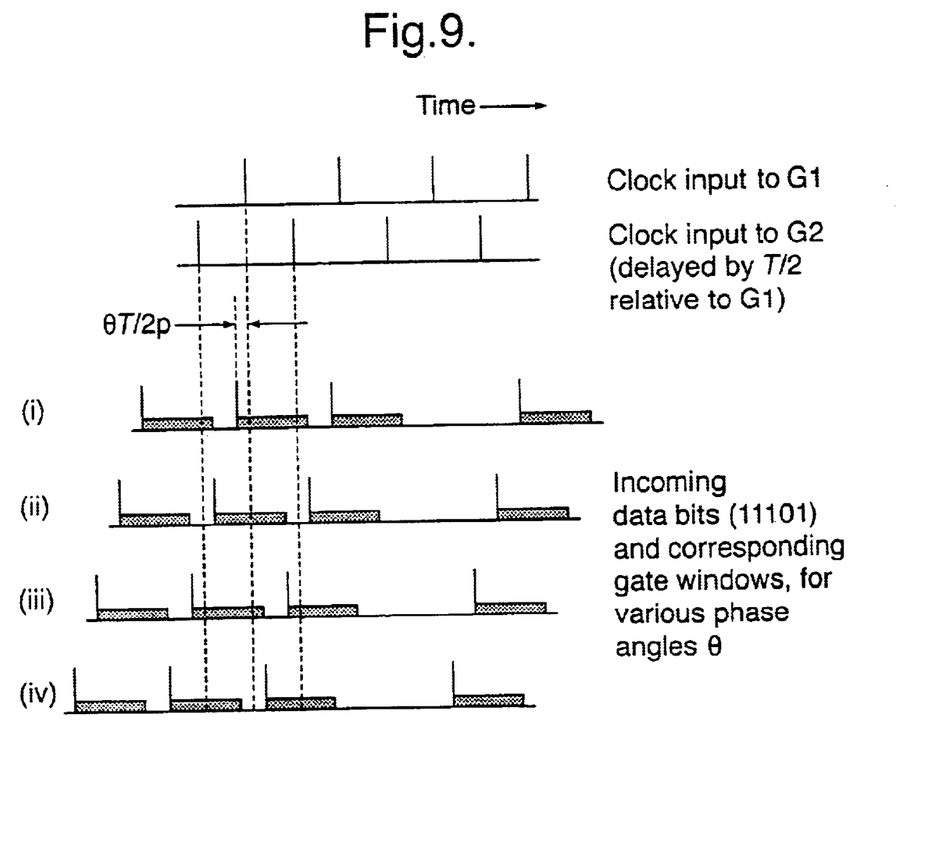
FIG. 9: a sequence of timing diagrams that illustrate the operation of the dual-gate regenerator.

FIG. 9 shows a sequence of timing diagrams that illustrate the operation of the dual-gate regenerator. The packet data bits (an example sequence 11101 is shown) arrive at the control ports of the gates G1 and G2, and each 'mark' causes the gates to open for a time 3T/4. The diagrams (i–iv) illustrate various values of θ, the phase of the local clock relative to the incoming packet data bits. It is convenient to write the gate width W and phase angle θ as normalised quantities, thus: $\overline{W}=W/T$ and $\overline{\theta}=\theta/2\pi$. Diagram (i) illustrates the case $0 \leq \overline{\theta} \leq \overline{W}-½$, in which the outputs from both gates G1 and G2 are clock pulses that have been correctly modulated by the incoming data bits. Diagram (ii) illustrates the case $\overline{W}-½<\overline{\theta} \leq ½$, in which the output from gate G1 (but not G2) are clock pulses that have been correctly modulated by the incoming data bits. Diagram (iii) illustrates the case $½ \leq \overline{\theta} \leq \overline{W}$, in which again the outputs from both gates G1 and G2 are correctly modulated. Diagram (iv) illustrates the last possibility, $\overline{W} \leq \overline{\theta}<1$, in which the output from gates G2 (but not G1) is correctly modulated.

Returning to FIG. 7, the components shown to the right-hand side of the two gates are used to attempt to select in each time slot whichever gate output gives a regenerated packet with the minimum of bit errors. One technique, shown in FIG. 7, is to make the selection in each time slot on the basis of a comparison of the total optical energy emerging from each gate, integrated over the duration of the packet. If the phase angle θ is such that the output from a gate consists of correctly modulated clock pulses then the total optical energy measured at the output of the gate, integrated over the duration of the packet, will be maximum (in effect, it is a measure of the number of 'marks' appearing in the regenerated data packet). However if θ is such that the clock pulses arrive at the gate at a time outside the gate window, then the energy transmitted by the gate will be zero or small. The circuit shown in FIG. 7 therefore makes these energy measurements and the result of the comparison is used to set the optical switch S, (for example, an optoelectronic device such as a lithium niobate switch) which performs the physical selection. The detectors, D1 and D2, are followed by electronic integrators I1 and I2, each of which provide a voltage proportional to the energy of the regenerated packet emerging from gates G1 and G2, respectively, in each time slot. The comparator C produces a digital output according to whether or not the signal from D1 exceeds that from D2. The global packet-level clock signal, synchronised to the time guard band between packets, is used to reset the integrators and also to clock the D-type flip-flop DT. This ensures that the switch S changes over only during the guard band, so as to avoid corrupting a packet. Notice that the detectors, switch and associated electronics operate at the packet rate (not the data bit rate) with a response time on the order of the width of the time guard band (which may be on the time scale of ~1 ns).

An alternative method of selecting the most appropriate gate output in each time slot may be to perform a bit-error measurement on the whole or part of the packet that emerges from each gate. For example, a test pattern could be incorporated as part of each packet, and this pattern would be received and any bit errors detected and counted in each time slot at the output of each gate. In a given time slot the output having zero or the least number of bit errors would be selected.

The optical delays (labelled ⌊ and L+ΔT/2 in FIG. 7) between the outputs of the gates and the selection switch S are used to allow sufficient time for the circuitry and switch S to operate before the packets arrive at the switch. Typically the delay ⌊ will be slightly less than one time slot in duration. Optionally, as shown in FIG. 7, the optical delay between the output of gate G1 and the switch S may be made slightly longer (by an amount T/2) than the delay between the output of gate G2 and the switch. The purpose of doing this is to compensate for the delay of T/2 at the input of gate G2, thus equalising the delay of both optical paths from the clock source to the output of the selector switch S. One benefit of doing this is that all the regenerated packets are then in precise bit synchronism with each other and with the local clock, and as mentioned earlier, the local clock may therefore be used as a continuous and regular source of pulses for use in subsequent digital optical processing stages. A further important benefit of equalising the delay in this way is to reduce the problem of 'packet slippage' in a large network.

There are two main causes of bit errors that may occur in the process of regenerating a packet using the bit-asynchronous regenerator. The first cause is jitter, as identified above, in the arrival time of the incoming packet data bits. The second main cause of bit errors is errors in the process used to select the output from one of the gates in each time slot. Thus, it will be understood, that if jitter and other timing errors can be quantified, and that information used to provide a control signal to control a feedback loop operative on one or more elements of the transmission system, the amount of timing jitter can be reduced.

What is claimed is:

1. A method for quantifying the amount of timing jitter experienced by an optical data pulse in an optical transmission system, the method comprising:
    generating a chirped optical pulse whose wavelength varies monotonically over the duration of the chirped pulse,
    applying in synchronism with the notional unjittered arrival time of the optical data pulse, the chirped optical pulse to a first input of an optical AND gate,
    applying the optical data pulse to a second input of the optical AND gate to trigger the AND gate and to produce at the output of the AND gate an output optical pulse having a wavelength determined by the amount of jitter experienced by the data pulse with respect to said notional unjittered arrival time, and
    thereafter detecting the wavelength of the optical output pulse to achieve a measure of the amount of jitter,
    wherein the chirped optical pulse is one of a stream of pulses, and
    wherein the data Pulse is one of a clocked stream of data pulses, the stream of chirped pulses being synchronized with the clock of the data pulse stream.

2. A method as in claim 1, wherein the measure of the amount of jitter is used to provide a control signal to control a feedback loop operative on one or more elements of the transmission system to reduce the amount of timing jitter.

3. A method as in claim 1, wherein if the duration of the chirped pulses is T, the data rate of the chirped pulses is 1/T.

4. A method as in claim 1, wherein the time between successive chirped pulse is non zero.

5. A method for using an optical AND gate and a wavelength detector to quantify the timing jitter suffered by optical pulses, said-method comprising:
    providing chirped pulses at a first input and optical data pulses at a second input, thereby providing output pulses from the AND gate having a wavelength dependent on the amount of jitter suffered by the input optical data pulses, and
    quantifying the amount of timing flier based on an output of the wavelength detector
    wherein the chirped pulses comprise a stream of pulses, and wherein the data pulses input to the second input comprise a clocked stream of data pulses, the stream of chirped pulses being synchronized with the clock of the data pulse stream.

6. A device for quantifying the amount of jitter suffered by an optical data pulse in an optical transmission system, said device comprising:
    an optical AND gate having an output and first and second inputs,
    the first input of the AND gate being connected to a source of chirped optical pulses, whose wavelength varies in a monotonic manner over the duration of said chirped pulses,
    wherein when one of said optical data pulses is received at the second input as an optical trigger pulse while one of the chirped pulses is present at the first input, the AND gate is triggered to produce an output optical pulse whose wavelength is determined by the amount of jitter in the optical trigger pulse, so that for a given jitter delay a corresponding output optical pulse is generated having a given wavelength,
    a wavelength detector for detecting the wavelength of said output pulses, and
    means for quantifying the amount of jitter suffered by the respective optical trigger pulses based on the detected wavelength,
    wherein the chirped optical pulses at the first input comprise a stream of pulses, and wherein the data pulses at the second input corn rise a clocked stream of data pulses, the stream of chirped pulses being synchronized with the clock of the data pulse stream.

7. A device as in claim 6, further comprising:
    means for generating a control signal to control a feedback loop operative on one or more elements of the transmission system to reduce the amount of timing jitter.

* * * * *